Patented May 29, 1945

2,377,291

UNITED STATES PATENT OFFICE 2,377,291

PREPARATION OF ZEIN SOLUTIONS DIRECTLY FROM GLUTEN

Roy E. Coleman, Chicago, Ill., assignor to Time, Incorporated, a corporation of New York No Drawing. Original application November 30, 1942, Serial No. 467,402, now Patent No. 2,352,604, dated July 4, 1944. Divided and this application October 25, 1943, Serial No. 507,600

10 Claims. (Cl. 106—153)

This invention relates to methods of preparing commercially usable solutions and coating compositions of prolamines or prolamine-containing proteins directly from glutens, either corn, wheat, barley, etc. It is particularly directed to such methods which will produce solutions and coating compositions of the alcohol-soluble portion of corn gluten, of controlled solution and gelling characteristics.

This application is a division of my application, Serial No. 467,402, filed November 30, 1942, now Patent No. 2,352,604, dated July 4, 1944.

Heretofore, in the preparation of zein solutions and coating compositions, including the substantially non-aqueous zein solutions and coating compositions of controlled solution and gelling characteristics as described in my prior Patent No. 2,185,110, granted December 26, 1939, for example, the zein is initially isolated from corn gluten and then dissolved in suitable solvents to form the desired solutions. To isolate zein from corn gluten as a commercially usable powder is a laborious and expensive process, involving steps of precipitation, settling, filtering, washing and drying. The solubility of the zein in zein solvents and the solution characteristics such as stability and gelling tendencies are largely dependent upon the care exercised in carrying out the steps of the process.

In accordance with the present invention I prepare solutions of zein or zein-containing proteins directly from corn gluten under conditions that will readily produce a wide variety of zein products in so far as properties and solubility characteristics are concerned, and thereby avoid the expense and objections incident to the preliminary isolation of zein in powder form. In carrying out the present invention, corn gluten, for example, in granular or powdered form, is treated with a suitable relatively low boiling point zein protein solvent or mixture of zein protein solvents, without the establishment of special conditions of hydrogen ion concentration either in the solvent or in the gluten, to extract the zein from the gluten. The extraction is carried out at elevated temperatures, say from about 120° to about 170° F., preferably between about 140° to about 150° F., for a short period of time generally not exceeding about three hours. It is preferred that the extraction time be not longer than about one-half to about one hour since within this time and at the temperature stated, the zein in the gluten is extracted and is not deleteriously affected.

The extract solution obtained as above described is now separated from the residual gluten by filtration, pressing, centrifugal separation or in any other desirable manner, mixed with a relatively high boiling point zein base solvent to be hereinafter described and distilled or otherwise treated to remove all or some of the relatively low boiling point solvent, as desired. The resulting residue is a solution of zein or zein-containing protein in the zein base solvent alone with all of the relatively low boiling point solvent removed, or in the zein base solvent and that portion of the relatively low boiling point solvent which has not been removed. The residual gluten, which still contains some protein, may be freed from retained solvent by washing and recovered for further use as a cattle food or for other purposes.

The resulting zein or zein-containing solutions in accordance with the present invention, over a wide range of concentrations, are stable on standing at temperatures of 80° F. and below and do not separate even when cooled to temperatures of 50 to 70° F. and somewhat below. When cooled even to temperatures as low as 10° above zero or to zero, solutions prepared in accordance with the present invention may separate and become solid; however, on heating again to temperatures of from about 45° to 70° F., a re-solution is effected, either without stirring or with slight stirring, and the solutions return to their normal form at the re-heating temperatures. In general, these solutions are substantially non-gelling and have but a slight tendency to increase in viscosity; that is, to thicken or become heavier in body. In many instances they exhibit practically no tendency to thicken or to gel over practical periods of time in the order of about 3 to 6 months and even up to one year and longer. These solutions remain stable and reasonably constant in their characteristics during the periods necessary for transportation and distribution, either in bulk or in packages, or for storage for reasonable periods of time, and hence their field of applicability is greatly increased.

The protein content of gluten varies widely, depending largely upon the source of the gluten and the method of making it or obtaining it as a by-product. In the case of corn gluten now on the market, the protein content varies from about 40% to 70%. Of this protein content, about 50% to 70% is aqueous-alcohol soluble and is extractable as zein or zein-containing proteins. The amount of zein or zein-containing proteins extracted in accordance with the methods of the present invention is largely influenced by the particular solvent or solvent mixture used to effect extraction as well as by the amounts thereof. For most purposes, about 2½ parts by weight of solvent to about 1 part by weight of gluten is sufficient to remove substantially all of the extractable zein protein. More or less solvent may be used, as desired, as is evident from the specific illustrative examples herein.

In accordance with the present invention the amount of base solvent added to the extract solution should be in a proportion to the amount of zein or other prolamine in the extract solution corresponding to the desired concentration of the prolamine in the resulting stable solution. For example, using a corn gluten containing 60% of protein with an estimated extraction of 65%, 39 lbs. of zein are available in 100 lbs. of the gluten. On the basis of producing a final solution in a base solvent of a solids content of 20%, then 156 lbs. of base solvent will be required for each 100 lbs. of gluten, providing the estimated amount of soluble protein is extracted. It is evident that the protein content of the extract solution may be determined prior to the admixture of base solvent with the extract solution, thereby making possible the determination of the precise amount of base solvent to be added to the extract solution to obtain the desired concentration of zein protein in the final solution.

The zein protein extracting solvents in accordance with the present invention may be, suitably, a single solvent or a solvent mixture which is a solvent for zein or other prolamine and which has a boiling point below about 125° C. and, preferably, of about 100° C. and below. Thus, the extracting solvent may be one or more of the well-known alcoholic zein solvents such as anhydrous methanol, or constant boiling point mixtures (azeotropes) of aliphatic alcohols such as 95% ethyl alcohol and 91% isopropyl alcohol. For convenience herein I term these alcoholic solvents "concentrated alcohol solvents." The extracting solvents may also be one or more of the concentrated alcohol solvents containing additional amounts of water, say from 40% to 50% in anhydrous methanol or in excess of that present in the azeotropes 95% alcohol and 91% isopropyl alcohol. Greater or lesser amounts of water than as stated may be used; however, best results are obtained with the use of added amounts of water within the percentage range stated. For convenience herein I term these alcoholic solvents "aqueous alcohol mixtures."

Another class of extracting solvents in accordance with the present invention comprises mixtures of an azeotropic concentrated alcohol solvent with a non-solvent and water. Examples of such solvents are mixtures of 95% ethyl alcohol or 91% isopropyl alcohol with dichlorethylene, trichlorethylene, ethyl acetate, benzene, cyclohexane, etc., and water. In this class of extracting solvents I also include mixtures of 95% alcohol and non-solvents as disclosed in my prior Patent No. 2,185,123, granted December 26, 1939, and non-aqueous azeotropic mixtures of anhydrous methyl alcohol with hexane, cyclohexane, benzene, carbon tetrachloride, dichlorethylene, trichlorethylene, acetone, methyl acetate, ethyl-acetate, methyl ethyl ketone, etc., because one constituent of the mixture, methyl alcohol, is a zein solvent.

In addition to the foregoing, wherein at least one constituent of an extracting solvent mixture is a zein solvent, the extractng solvents may be suitable azeotropic mixtures which are zein protein solvents wherein the individual constituents of the mixture are non-solvents for zein proteins. Thus, they may be azeotropic mixtures of water on the one hand and dioxan or butyl alcohol on the other. Dioxan forms with water a constant boiling point mixture containing 80% dioxan boiling at 86.9° C.; and butyl alcohol forms with water a constant boiling point mixture containing 63% butyl alcohol boiling at 92° C.

In general, extracting solvents consisting of or including the aqueous alcohol mixtures are capable of extracting larger amounts of zein protein from gluten than are the extracting solvents consisting of or including a concentrated alcohol solvent. It has been noted that for practical extraction procedures, using either a concentrated alcohol solvent alone or an aqueous alcohol mixture alone, approximately 2½ parts by weight of solvent to 1 of gluten may be used. At this concentration, with gluten containing approximately 60% total protein, the extract solutions of the concentrated alcohol solvent contain a maximum zein protein content of approximately 10% whereas the extract solutions of the aqueous alcohol mixture solvents contain a maximum zein protein content of from about 12% to about 15% and even up to 20%. In addition, the aqueous alcohol mixture solvents are capable of extracting a substantially larger proportion of a desirable type of zein present in the protein of the gluten than are the concentrated alcohol solvents.

The base solvents are relatively high boiling compounds or mixtures of compounds having a boiling point above about 125° C., preferably above about 150° C. and having a suitable balance between the hydrocarbon constituents or radicals present in the solvent or solvent mixtures and the polar constituents or radicals present therein. A certain proportion of hydroxyl radicals in the base solvents is required to secure and maintain solvent action. Other polar radicals such as —O—(ether oxygen), —Cl, —NH₂ and COOH appear to aid or cooperate with the —OH in securing the necessary conditions of polarity in the base solvents (in which term I include mixtures of base solvents), for solvent action.

The proportion of polar radicals to hydrocarbon or non-polar radicals which I have found to be desirable lies within a range which extends between the limits of absolute methanol on the one hand, having 53% hydroxyl and 47% hydrocarbon radicals, and absolute ethanol on the other hand having 37% hydroxyl and 63% hydrocarbon radicals. The benzyl radical acts as if it were intermediate the methyl and ethyl radicals. This range is approximate and may vary somewhat depending on the solvent or solvent mixture used. The limits of this range are indicative of solvent properties and provide a close and adequate guide to enable the operator, by simple experimentation, to determine the required balance of polar and hydrocarbon radicals in the base solvent or mixture of base solvents in accordance with the present invention.

It may be stated that the base solvents in accordance with the present invention may be any one of the solvents or mixture of solvents described in my prior Patent No. 2,185,110 which has the required balance of polar and non-polar radicals, and a boiling point above about 125° C., preferably, above about 150° C. as pointed out above. For a more complete description of the kinds of solvents which may be used as base solvents in accordance with the present invention than is disclosed herein, reference is made to the description of these solvents in my prior Patent No. 2,185,110.

Examples of base solvents in accordance with the present invention are the glycols such as diethylene glycol, propylene glycol, triethylene glycol and mixtures thereof, including mixtures which contain ethylene glycol; diacetone alcohol; closed chain cyclic alcohols such as benzyl alcohol, cyclohexanol, furfuryl alcohol, tetrahydrofurfuryl alcohol and mixtures of closed chain alcohols; glycol ethers such as ethylene glycol mono-methyl ether, diethylene glycol mono-methyl ether, ethylene glycol mono-ethyl ether, diethylene glycol monoethyl and mixtures of glycol ethers; mixtures of two or more of the foregoing enumerated base solvents; mixtures of one or more of the foregoing base solvents with glycerine, or other solvents or mixtures of solvents, providing the mixture has the required polar to non-polar radical balance and the required relatively high boiling point. It is to be understood that the foregoing specifically mentioned solvents or mixtures of solvents are not intended to be inclusive of all the base solvents which may be used in accordance with the present invention since they are merely set forth for illustrative purposes.

Zein or zein-containing extract solutions containing any one or more of the fore-going base solvents, in accordance with the present invention may be boiled, distilled or otherwise treated to remove part or all of the diluent. It is evident that practically all of the extracting solvent, including any water carried from the gluten to the extract solution, may be removed, thereby obtaining solutions of zein or zein-containing proteins, in the base solvent which, for all practical purposes, are substantially anhydrous. Such solutions vary widely in character, depending upon the choice of solvents or solvent mixtures used, as is to be expected, and some of them may undergo changes (apparent insolubility, for example), during the solvent and water removal which effect the solvent characteristics of the zein and zein-containing proteins in the base solvent utilized. These changes, where they take place, are not of a permanent character and it is possible to effect a re-solution of the zein or zein-containing proteins in the base solvents by the addition of a small amount of water, say in the order of from about 1 to 3% by weight, or an equivalent amount of other highly hydroxylated compound, such as methyl or ethyl alcohol or a mixture of such compounds.

In the preparation of usable solutions having a wide field of applicability, I prefer that the removal of the relatively low boiling point solvent and water be controlled so as to leave in the final solutions at least about 1 to 3% by weight of water or an equivalent amount of other highly hydroxylated compound, preferably water. Where this is not possible, water may be added to the final solution, in the amounts stated. While water is, in general, not an essential constituent of some of the solutions formed in accordance with the present invention, the solutions are generally of an improved character when they contain small amounts of water. The solutions may contain larger amounts of water, say between 5 to 10%, or even more.

As already pointed out, the type or character of the zein-containing protein produced by the extraction is in no small part dependent on the character of the extraction solvents used. This condition is particularly pronounced when the highly aqueous alcohols or the high water azeotropes such as dioxan-water or n-butyl alcohol-water mixtures are used as solvents. Not only do these solvents effect the extraction of a larger amount of the zein-containing protein than do the more concentrated alcohols, but they also produce by their extraction a type of zein protein which generally produces solutions having a high viscosity and pronounced colloidal consistency. On the other hand the zein protein produced with the concentrated alcohols and less aqueous diluents tends to produce solutions having a lower viscosity and a lesser colloidal consistency. It is thus evident that various types of zein protein having substantially different properties can be produced by proper selection and composition of the extracting solvents.

From the foregoing it is manifest that the nature and properties of the finished solution will be determined by the amount of zein protein present in the solution, the type or character of the zein protein extracted by the particular extracting solvent used and by the nature of the base solvent. It is apparent that with the extracting solvent and base solvent combinations possible, a wide variety of solutions for many uses can be produced by the method of the present invention.

Within the range of the many possible combinations and the method in accordance with the present invention, solutions may be produced which require further adjustment or modification in order to secure improved solution or desired stability and controlled gelling properties. Such adjustments or modifications can be readily effected by the use of rosin, fatty acids, compatible amines such as monoethanolamine, triethanolamine, etc., amine soaps of rosin or fatty acids, or by the various methods and materials for producing stable, controlled gelling, zein solutions described in my issued Patents Nos. 2,185,122, 2,246,779, and 2,298,548. The addition of suitable materials for effecting desired modification or adjustment may be made to the extract solution containing the base solvent before distilling off the extracting solvent or to the final solution. The preferable procedure and materials with particular solutions may be easily determined by experimentation.

In the following examples I disclose illustrative methods for producing zein or zein-containing solutions directly from gluten in accordance with the present invention. In the examples and elsewhere throughout the specification, the term "parts" indicates parts by weight.

*Example 1.*—600 parts of 91% isopropyl alcohol were added to 165 parts of powdered gluten in a vessel. The mixture was heated to about 180° F. and held at about that temperature for about ½ hour with stirring to extract the zein-containing proteins from the gluten. The mixture was then forced through a filter to separate the zein-containing extract. To 100 parts of the extract 40 parts of propylene glycol were added and the mixture was slowly heated to about 250° F. and held at about that temperature with stirring until cessation of visible boiling. The residue was a solution of zein-containing proteins principally in propylene glycol.

In the following examples the manipulative procedures were the same as set forth in Example 1 except that the extractions were carried out at 140° F. and the proportions varied as hereinafter set forth. In each instance the mixture of extract and relatively high boiling point solvent was heated until cessation of visible boiling.

*Example 2.*—75 parts of powdered gluten were extracted with 187 parts of a solvent mixture consisting of 70% of denatured 95% ethyl alcohol ("Synasol"), and 30% of water. 29½ parts of diethylene glycol were added to 50 parts of the extract. The procedure was as in Example 1 and the resulting solution was a solution of zein-containing proteins principally in diethylene glycol.

*Example 3.*—29½ parts of propylene glycol were added to 50 parts of the extract of Example 2. The procedure was as in Example 1 and the resulting solution was a solution of zein-containing proteins principally in propylene glycol.

*Example 4.*—29½ parts of diethylene glycol monoethyl ether were added to 50 parts of the extract of Example 2. The procedure was as in Example 1 and the resulting solution was a solution of zein-containing proteins principally in diethylene glycol monoethyl ether.

*Example 5.*—30 parts of powdered gluten were extracted with 75 parts of a solvent mixture consisting of 80% of dioxan and 20% of water. 30 parts of ethylene glycol monoethyl ether were added to 47 parts of the extract. The procedure was as in Example 1 and the resulting solution was a solution of zein-containing proteins principally in ethylene glycol monoethyl ether.

*Example 6.*—30 parts of powdered gluten were extracted with 75 parts of a solvent mixture consisting of 63% of n-butyl alcohol and 37% of water. 19.3 parts of benzyl alcohol were added to 44 parts of the extract. The procedure was as in Example 1 and the resulting solution was a solution of zein-containing proteins principally in benzyl alcohol.

*Example 7.*—20 parts of powdered gluten were extracted with 50 parts of a solvent mixture consisting of 60% of 91% isopropyl alcohol and 40% of water. 17½ parts of diethylene glycol were added to 35 parts of the extract. The procedure was as in Example 1 and the resulting solution was a solution of zein-containing proteins principally in diethylene glycol.

At the cessation of boiling as referred to in the examples some proportion of the lower boiling constituents of the diluent originally used remains in the final solution. The proportion thereof so remaining depends upon the final temperature and the boiling point curve of the mixture. Considerable proportions of the diluent or of its constituents, including water, may remain without causing gelling of the final solution in reasonable periods of time. This is particularly true where the glycols are used. In this respect the final solutions show differences from solutions of commercial zein containing large amounts of water as in the prior art, apparently by reason of some changes in the character or structure of the zein-containing proteins of the corn gluten taking place in the process of the present invention, the nature of which changes is not as yet understood.

In general and influenced by the type and amount of zein protein present, the solutions prepared as described above and the coating compositions prepared therefrom have the properties, particularly when heated, of being able to "give up" their solvent or solvents readily, and when applied to a surface they quickly and readily form tough, flexible, non-tacky, hard and generally transparent coatings even when retaining some solvent. The coatings formed by these zein-containing solutions and coating compositions are very strong and have adherent properties. In these solutions and coating compositions the film forming properties thereof can be built up to produce films of great toughness, flexibility, hardness and gloss. Under normal temperature conditions, many of the zein-containing solutions or coating compositions will produce non-blushing coatings on drying, without the aid of supplementary anti-blushing agents as in the prior art.

The coating compositions prepared from the above solutions may be modified and used as fully described in the aforementioned application Serial No. 467,402.

While my invention has been described in connection with certain specific examples, it is, of course, obvious that it is not to be construed as limited to these examples or to the details of the methods set forth therein, since obvious changes in materials, proportions and method details will be apparent from the foregoing.

In the claims the expression "an elevated temperature in the order of about 120° F. to about 170° F." is not to be construed as a precise critical range, but, rather, as a range of temperatures indicative of the elevated temperature at which the extractions may be carried out.

I claim:

1. The method of preparing directly from gluten a solution of zein-containing proteins in a solvent or mixture of solvents comprising as an essential solvent constituent for the zein-containing proteins, a solvent having a boiling point above about 125° C. and having a proportion of polar to non-polar radicals which lies within a range extending between the limits of the proportion of polar to non-polar radicals of methanol and the proportion of polar to non-polar radicals of ethanol, which comprises contacting gluten with an aqueous zein protein solvent having a boiling point below about 125° C. at an elevated temperature in the order of about 120° F. to about 170° F. to extract zein-containing proteins from the gluten, separating the extract solution from the residual gluten, mixing the aforesaid solvent having a boiling point above about 125° C. with said extract solution and removing at least part of said relatively low boiling point solvent from the solution.

2. The method of preparing directly from gluten a solution of zein-containing proteins in a solvent or mixture of solvents comprising as an essential solvent constituent for the zein-containing proteins, a solvent having a boiling point above about 150° C. and having a proportion of polar to non-polar radicals which lies within a range extending between the limits of the proportion of polar to non-polar radicals of methanol and the proportion of polar to non-polar radicals of ethanol, which comprises contacting gluten with an aqueous zein protein solvent having a boiling point below about 125° C. at an elevated temperature in the order of about 120° F. to about 170° F. to extract zein-containing proteins from the gluten, separating the extract solution from the residual gluten, mixing a zein-containing protein solvent comprising the aforesaid solvent having a boiling point above about 150° C. with said extract solution and removing substantially all of said relatively low boiling point solvent from the solution.

3. The method of preparing directly from gluten a solution of zein-containing proteins in a solvent or mixture of solvents comprising as an essential solvent constituent for the zein-containing proteins, a solvent having a boiling point above about 150° C. and having a proportion of polar to non-polar radicals which lies within a range extending between the limits of the proportion of polar to non-polar radicals of methanol and the proportion of polar to non-polar radicals of ethanol, which comprises contacting gluten with an aqueous zein protein solvent having a boiling point below about 125° C. at an elevated temperature in the order of about 120° F. to about 170° F. to extract zein-containing proteins from the gluten, separating the extract solution from the residual gluten, mixing a zein-containing protein solvent comprising the aforesaid solvent having a boiling point above about 150° C. with said extract solution and removing at least part of said relatively low boiling point solvent from the solution.

4. The method of preparing directly from gluten a solution of zein-containing proteins in a solvent or mixture of solvents comprising as an essential solvent constituent for the zein-containing proteins, a solvent having a boiling point above about 150° C. and having a proportion of polar to non-polar radicals which lies within a range extending between the limits of the proportion of polar to non-polar radicals of methanol and the proportion of polar to non-polar radicals of ethanol, which comprises contacting gluten with an aqueous zein protein solvent having a boiling point below about 100° C. at an elevated temperature in the order of about 120° F. to about 170° F. to extract zein-containing proteins from the gluten, separating the extract solution from the residual gluten, mixing a zein-containing protein solvent comprising the aforesaid solvent having a boiling point above about 150° C. with said extract solution and removing at least part of said relatively low boiling point solvent from the solution.

5. The method of preparing directly from gluten a solution of zein-containing proteins in a solvent or mixture of solvents comprising a glycol as an essential solvent constituent for the zein-containing proteins, which comprises contacting gluten with an aqueous zein protein solvent having a boiling point below about 125° C. at an elevated temperature in the order of about 120° F. to about 170° F. to extract zein-containing proteins from the gluten, separating the extract solution from the residual gluten, mixing a zein-containing protein solvent comprising a glycol with said extract solution and removing at least part of said relatively low boiling point solvent from the solution.

6. The method of preparing directly from gluten a solution of zein-containing proteins in a solvent or mixture of solvents comprising a glycol as an essential solvent constituent for the zein-containing proteins, which comprises contacting gluten with an aqueous zein protein solvent having a boiling point below about 125° C. at an elevated temperature in the order of about 120° F. to about 170° F. to extract zein-containing proteins from the gluten, said zein protein solvent comprising a mixture of a zein protein solvent and a non-solvent for zein, separating the extract solution from the residual gluten, mixing a zein-containing protein solvent comprising a glycol with said extract solution and removing at least part of said relatively low boiling point solvent from the solution.

7. The method of preparing directly from gluten a solution of zein-containing proteins in a solvent or mixture of solvents comprising a glycol as an essential solvent constituent for the zein-containing proteins, which comprises contacting gluten with an aqueous zein protein solvent having a boiling point below about 125° C. at an elevated temperature in the order of about 120° F. to about 170° F. to extract zein-containing proteins from the gluten, said zein protein solvent comprising an azeotropic mixture of an alcohol having from two to three carbon atoms in the molecule and water, and a non-solvent for zein, separating the extract solution from the residual gluten, mixing a zein-containing protein solvent comprising a glycol with said extract solution and removing at least part of said relatively low boiling point solvent from the solution.

8. The method of preparing directly from gluten a solution of zein-containing proteins in a solvent or mixture of solvents comprising propylene glycol as an essential solvent constituent for the zein-containing proteins, which comprises contacting gluten with a relatively low boiling point zein protein solvent comprising 95% ethyl alcohol and water at an elevated temperature in the order of about 120° F. to about 170° F. to extract zein-containing proteins from the gluten, separating the extract solution from the residual gluten, mixing a zein-containing protein solvent comprising propylene glycol with said extract solution and removing at least part of said relatively low boiling point solvent from the solution.

9. The method of preparing directly from gluten a solution of zein-containing proteins in a solvent or mixture of solvents comprising diethylene glycol monoethyl ether as an essential solvent constituent for the zein-containing proteins, which comprises contacting gluten with a relatively low boiling point zein protein solvent comprising 95% ethyl alcohol and water at an elevated temperature in the order of about 120° F. to about 170° F. to extract zein-containing proteins from the gluten, separating the extract solution from the residual gluten, mixing a zein-containing protein solvent comprising diethylene glycol monoethyl ether with said extract solution and removing at least part of said relatively low boiling point solvent from the solution.

10. The method of preparing directly from gluten a solution of zein-containing proteins in a solvent or mixture of solvents comprising diethylene glycol as an essential solvent constituent for the zein-containing proteins, which comprises contacting gluten with a relatively low boiling point zein protein solvent comprising 95% isopropyl alcohol and water at an elevated temperature in the order of about 120° F. to about 170° F. to extract zein-containing proteins from the gluten, separating the extract solution from the residual gluten, mixing a zein-containing protein solvent comprising diethylene glycol with said extract solution and removing at least part of said relatively low boiling point solvent from the solution.

ROY E. COLEMAN.